Patented May 9, 1944

2,348,200

UNITED STATES PATENT OFFICE 2,348,200

PROCESS FOR SULPHONATING ROSIN

Douglas Fronmuller and Berwyn B. Thomas, Appleton, Wis., assignors to The Institute of Paper Chemistry, a corporation of Wisconsin No Drawing. Application March 28, 1942, Serial No. 436,616

1 Claim. (Cl. 260—98)

Our invention relates to improvements in dispersing agents and improved process of making the same and has particular reference to a dispersing agent made by an improved process of sulphonating a resin containing abietic acid, for example rosin, which contains over 90% of that material.

We are aware that it has been proposed to sulphonate rosin, but the products produced according to prior art methods have not been characterized by any special value or advantage as stabilizing agents for highly acid dispersions, nor have such prior processes been commercially very efficient in respect of the amount of yield.

General method

According to our improved process, the raw material may be rosin which contains some 90% of abietic acid, or, if desired, we can employ abietic acid extracted from any resin consisting mainly of the carboxylic acids of diterpenes. The material, whether rosin or relatively pure abietic acid, is dissolved in an inert or non-reactive liquid which has a relatively low boiling point, for example liquid $SO_2$ which boils at $-10°$ C. However, any other non-reactive or inert liquid which boils at a relatively low temperature may be employed, if commercially available, or any other non-reactive liquid might be employed, if maintained at a low enough temperature by suitable refrigerating means. As examples of the latter class of materials, chloroform, carbon tetrachloride, or petroleum ether could be used. However, it is desirable to carry on the reaction at a relatively low temperature, for example not materially higher than $-10°$ C., or even lower, in order to obtain still better results.

The solution is sulphonated by the addition of the necessary quantity of fuming sulphuric acid, i. e. sulphuric acid which gives off free $SO_3$, and preferably having a strength of from 20 to 60%. The higher the percentage, the better the results.

The yield may be improved by using a catalyst, for example aluminum borate or zinc chloride.

Ether or any other suitable water immiscible solvent, for example chloroform or carbon tetrachloride, is preferably added at a suitable stage in the process for the purpose of dissolving the saturated materials such as resins, or other impurities which are insoluble in sulphuric acid alone.

When the reaction step of the process is complete, water is added, preferably in the form of ice, and the $SO_2$ or other inert solvent is removed by evaporation so as to leave the product in aqueous solution. The ether or other water immiscible solvent, which contains the unreacted material, or the other undesired materials which have been reacted, is separated from the aqueous solution by decantation or any other suitable method.

Preferably, the excess acid is neutralized by any suitable alkaline material such as caustic soda or soda ash. The solution thus obtained can be used as a dispersing agent without further treatment.

It will be understood that if, instead of $SO_2$, a refrigerated solvent such as chloroform or ether is employed in which to carry on the sulphonation process, it may not be necessary to add ether or other water immiscible solvent at any later stage in the process.

Specific example

Dissolve 25 grams of rosin of good grade or purified abietic acid in 250 ml. of liquid $SO_2$, at $-10°$ C. Add to this solution 25 ml. of ether. The catalyst used was 0.125 gram of aluminum borate (commercially pure grade).

To the batch prepared as above described, there is then added, drop by drop, 12.5 ml. of 60% fuming sulphuric acid. This requires about 15 minutes. After all of the sulphuric acid has been added, the mixture is stirred continuously for about 3 hours, and from time to time, additional quantities of liquid $SO_2$ are added in order to make up for loss by evaporation.

After the reaction is substantially complete, the batch is discharged into 125 grams of ice together with 125 ml. of ether and is allowed to warm up until the ice melts.

When the ice has all been melted, 20 grams of sodium carbonate (soda ash) are added, and the material is heated to 20° C. The ether is then decanted, or separated in any other suitable manner, from the aqueous solution. Preferably, the solution is then washed a second time with 100 ml. of ether, which is separated as before. The aqueous solution is then boiled free of $SO_2$ and is ready for use.

According to the method described, a yield of 60% can be obtained.

The product prepared as above described is free from hydrolysis in acid solutions. One of its principal uses is as a dispersing agent for rosin dispersions used in the manufacture of sized paper. Preliminary tests also indicate that it is useful as a wetting agent or as an ingredient of a detergent which is to be used in extremely acid waters and, of course, also in waters containing alkaline ingredients such as lime or magnesia.

Our preliminary tests indicate that the material can be used as a dispersing agent in aqueous systems having a pH as low as 0.5.

The scope of the invention should be determined by reference to the appended claim.

We claim:

The process of preparing an improved sulphonated abietic acid composition which comprises reacting at a temperature not materially higher than $-10°$ C., and in the presence of an aluminum borate catalyst, a rosin containing abietic acid with fuming sulphuric acid in a reaction medium made up of liquid sulphur dioxide and an inert water immiscible organic solvent, adding $H_2O$ to the reaction mixture and separating the water immiscible solvent containing unwanted materials from the resulting aqueous solution containing the desired sulphonated abietic acid composition, said organic solvent being ether.

DOUGLAS FRONMULLER.
BERWYN B. THOMAS.